Jan. 20, 1970     F. E. SATCHELL ET AL     3,490,770

GOLF BALL

Filed June 21, 1967

INVENTORS
FRED E. SATCHELL
DAVID T. RETFORD
ROBERT S. BARNES

BY *Hofgren, Wegner, Allen, Stellman & McCord.*

ATTORNEYS

United States Patent Office 3,490,770
Patented Jan. 20, 1970

3,490,770
GOLF BALL
Fred E. Satchell and David T. Retford, Cincinnati, Ohio, and Robert S. Barnes, Muskegon, Mich., assignors to Brunswick Corporation, a corporation of Delaware
Filed June 21, 1967, Ser. No. 647,667
Int. Cl. A63b 37/08, 57/00, 69/36
U.S. Cl. 273—231                                  7 Claims

ABSTRACT OF THE DISCLOSURE

A liquid center golf ball and a method for making the same in which the liquid core is formed from a liquid reactive mass such as a polyvinyl chloride plastisol by forming the plastisol to spherical shape, e.g. in a mold, and then reacting the outer portion of the mass to form a solidified skin while leaving the inner portion liquid. The resulting sphere can be frozen, wound and covered to provide the liquid center golf ball.

---

This invention relates to golf balls which can be manufactured by a simplified procedure in accordance herewith.

In the manufacture of various items of commerce, it is necessary or desirable to enclose or encapsulate a liquid in a plastic skin or shell. Such items of commerce include liquid centers for golf balls, pressure rupturable capsules containing a pigmented liquid or ink which may be used in the manufacture of carbonless copy paper, plastic shells containing a freezable or chillable liquid encapsulated therein as an article of commerce which can be used as an ice cube substitute, and like articles. The present invention is directed to such articles of commerce and is especially concerned with the manufacture of liquid centers for golf balls and the manufacture of golf balls containing such liquid centers.

In the art of manufacture of golf balls the development of the rubber thread wound center has been considered a major breakthrough in improving the performance of a golf ball. Soon thereafter it was found that a liquid-filled center performed very well and development was directed toward the improvement of the liquid center. Today, the thread wound liquid center golf ball is considered the standard of excellence by the majority of both professional and amateur players.

The manufacture of a liquid center for a golf ball has heretofore usually involved a multi-operation procedure. In one method a suitable liquid, such as ethylene glycol is encapsulated within a gelatin capsule to form a liquid filled sphere. This sphere is then frozen, covered with two preformed hemispherical rubber shells and placed in a heated mold and the rubber shells are vulcanized. The resulting rubber covering provides adequate strength for the sphere so the covered sphere can be used as a center of the golf ball. Another method of manufacture involves the pre-curing of hemispherical rubber shells, the application of a suitable cement to the lips of the rubber shells, immersion of the shells in a liquid, and then matting and bonding the two rubber shells together to form a sphere containing the liquid. Another method of manufacture involves the placing of a liquid filled gelatin pill in pre-cured hemispherical rubber shells and bonding the shells together with adhesive. It has also been suggested to preform a complete hollow sphere and inject the liquid through the sphere wall. However, each of these procedures requires many operational steps as well as multiplicity of molds, presses, assembly fixtures and/or the like. This makes the liquid center an expensive item to produce and the high cost of manufacture is reflected in the high price paid by the consumer for the liquid center golf balls.

Figure 1:
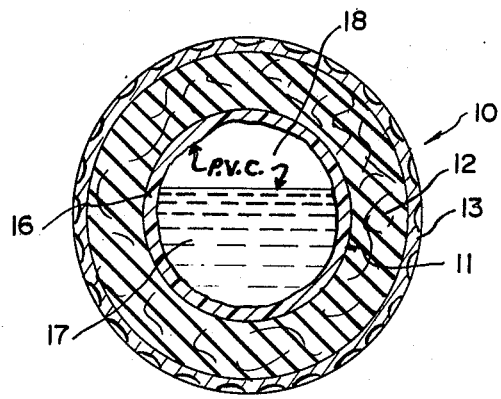
Figure 2:
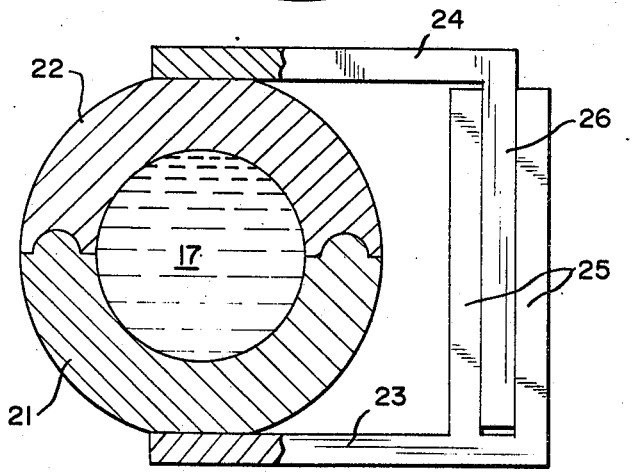
Figure 3:
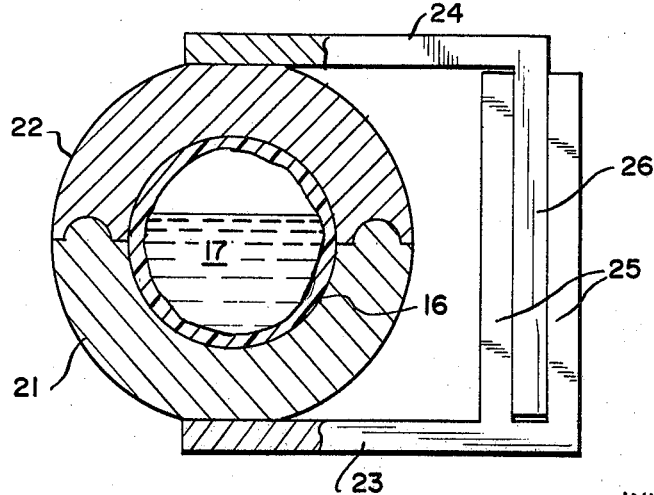

In the drawings:
FIG. 1 is a cross-section through an embodiment of a golf ball of this invention;
FIG. 2 is a cross-section through an assembled mold including liquid ingredients for manufacturing the embodiment of liquid center of the golf ball of FIG. 1; and
FIG. 3 is a cross-section through the assembled mold of FIG. 2 containing the embodiment of liquid center after it has been formed.

While this invention is susceptible of the embodiment in many different forms, there is shown in the drawings and will herein be described in detail an embodiment of the invention with the understanding that the present disclosure is to be considered as an exemplification of the principles of the invention and is not intended to limit the invention to the embodiment illustrated.

The article of manufacture of the present invention has a solid skin enclosing a liquid central portion. The composition of the skin includes a solid molecular structure which is derived from the molecular structure of the liquid portion. The liquid molecular structure is convertible to the set solid molecular structure, e.g. by thermosetting, polycondensation, catalytic conversion, or by other chemical conversion mechanism. Thus, the liquid of the central portion is a precursor of the solid skin.

Turning now to FIG. 1 of the drawings, there is illustrated a golf ball 10 embodying a structure of the present invention in the form of a central core 11. The golf ball 10 also includes a rubber thread winding 12 about central core 11 and an impact and rupture resistant cover 13 enclosing the winding 12. The central core 11 includes a skin portion 16 and a liquid portion 17. Air or other gas may be entrapped or otherwise present within the skin 11 during manufacture of the central core portion 11, as indicated at 18.

Generally, in the manufacture of articles according to this invention, the shape of the article is formed from a mass of liquid which is settable or convertible to a solid portion. Thereafter the outer portion only of the liquid mass is set or converted to form the solid skin enclosing the remaining portion of the liquid. Various procedures for converting settable or convertible liquids to solids are well known in the art and any of these can be used in making articles of the present invention. Most commonly, a thermosetting composition would be used and the setting step would be carried out by heating the mass of liquid from the exterior at a sufficiently high temperature to set only the outer portion of the mass of liquid. Alternatively, for example, polymerizable resin which is polymerizable by contact with a catalyst under certain temperature and/or pressure conditions, e.g. ambient temperature and atmospheric pressure, as prescribed by the supplier of the resin, can be converted to a solid in the manufacture of articles of this invention by contacting only the outer portion of the liquid mass with the catalyst under the prescribed conditions. Similarly, a cross-linkable polymer or pre-polymer which is liquid in nature can be set by contacting the outer portion only of the liquid mass with sufficient cross linking agent to form a skin under the prescribed cross linking conditions. Alternatively, a liquid cross linking agent can be contacted at its outer portion with liquid monomer or solid polymer or pre-polymer to cross link the monomer, pre-polymer or polymer to cross link the outer portion of the liquid mass and thereby form the solid skin leaving a liquid center composed of cross linking agent. Other conversion systems will be apparent to those in the art from the descriptions contained herein.

As a more particular illustration of the manufacture of an article in accordance herewith and with reference to FIGS. 2 and 3 of the drawings, there is provided a system in which a liquid core for a golf ball can be manufactured. The system includes a pair of mating mold halves 21 and 22 of conventional design for molding a golf ball core. The mold halves 21 and 22 are made of a heat transmitting material for transmitting heat applied externally through mold walls to the liquid material 17 within the mold. A mold clamp is also provided having clamp arms 23 and 24 for releasably clamping the mold halves together. It will be noted that each of the mold halves has a flat surface for engaging a clamp arm. One clamp arm 23 includes an upstanding bifurcated portion 25 defining a receiver for receiving a downwardly extending leg 26 from the other arm 24. A suitable bolt and nut or other fastening system can be used to releasably secure leg 26 within bifurcated portion 25 to hold the mold in closed position once the mold halves have been assembled.

In use of the molding system illustrated in FIGS. 2 and 3, the mold clamp and mold halves are opened and each mold half is filled with an ambient-temperature-stable, convertible liquid material. The material is preferably in the form of a viscous liquid so that the mold halves can be assembled with minimum spilling. The mold halves are then joined along the seam and placed in the clamp which is used to hold them tightly together so as to prevent leakage. Sufficient heat is then applied to the outside of the assembled mold to convert only the external portion of the liquid 17 to a solid skin 16 (FIG. 3) while retaining a major proportion of the liquid 17 in stable liquid state. In the case of thermosetting compositions, this can be readily accomplished by providing a liquid bath, or other environment, at a temperature well above the temperature required for setting the liquid material or composition within the mold. The mold can then be immersed in the bath for a suitable short period of time sufficient to convert only the outside portion of the liquid. Since the inner portion of the liquid is not heated to a temperature sufficient to convert it, it remains as a stable liquid.

Alternately, and still referring to FIGS. 2 and 3, where liquid conversion techniques are used which employ two reactants which react with each other to form a solid material, e.g. by cross linking, catalyst action on a liquid, polycondensation of two different compounds or the like, one of the reactants can be coated on the inside of the mold halves and the other reactant, in liquid form, can then be placed within the coated mold halves and then the mold is assembled. The mold is then retained under conditions, e.g. for a time and/or at a temperature sufficient to cause the reaction of the two reactants at the exterior portion of the liquid mass to form the solid skin 16. The mold is then disassembled as above and the finished article is removed.

In the manufacture of a golf ball employing a liquid core produced according to the foregoing, the liquid in the core is usually of a freezable composition, i.e. freezable at a reasonable temperature level such as about −50° F. The core removed from the mold is frozen to solidify the liquid and rubber thread or other elastic thread is then tightly wound about the core. Freezing the core prevents deformation of the core during winding. After winding, the wound core is then placed and centered in a cover mold and a cover of a material normally used for golf ball covers is molded around the wound core. The winding of the central core and the covering of the wound core are by conventional procedures known to those in the art and do not alone constitute the present invention. However, in the preferred form of the invention, in the production of a golf ball, these procedures, when used in combination with other procedures described herein, are intended to be within the scope and spirit of the invention.

As a more specific example of the manufacture of a liquid center for a golf ball according to the procedure of the present invention, a vinyl plastisol was prepared having the following composition:

| Material— | Parts by weight |
|---|---|
| Bakelite QYNV | 60 |
| Pliovic M–70 | 30 |
| Paraplex G–33 | 30 |
| Diisodecyl phthalate | 15 |
| Sartomer SR 7 | 10 |
| Vanstay RZ 25 | 2 |
| Stan-Tone 10 PC01 | 1 |

Balkelite QYNV is a polyvinyl chloride obtainable from Union Carbide Chemical Corporation and Pliovic M–70 is a polyvinyl chloride containing about 95% of its molecular units derived from vinyl chloride and obtainable from Goodyear Chemical Company. Paraplex G–33 is a polyester marketed by Rohm and Haas Company as a plasticizer for use in polyvinyl chloride plastisol. Sartomer Resin SR 7 is a high boiling low viscosity liquid resin that has been designed specifically as a pound-for-pound replacement for vinyl resins and plastisols (other vinyl resins) and is believed to be predominantly triethylene glycol dimethacrylate. Vanstay RZ 25 is a barium-cadmium-zinc compound in organic solvent used as a heat stabilizer for plastisols, available from R. T. Vanderbilt Company, and Stan-Tone 10 PC01 is a colored pigment dispersed in diallyl phthalate or other suitable plasticizer and available from Harwick Standard Chemical Company.

In this specific example, an aluminum mold, as illustrated in FIGS. 2 and 3, was used. The mold was designed with generally uniform mold wall thickness overall. An insulated metal beaker was used to hold a molten mass of lead as the heating medium for setting the composition. The beaker was large enough to accommodate the mold and mold clamp together in addition to the molten lead. The mold was prepared by coating the inner cavity with a silicone mold release agent. The two mold halves were then filled with the plastisol specifically identified above and the mold halves were mated in such a manner to avoid any air being entrapped. The halves were then clamped tightly together. The molten lead bath was preheated to a temperature of about 380° to 385° C. and the clamped mold was plunged into the molten lead bath for 15 seconds total immersion time. The mold was removed and immediately plunged into and held in cold water for 1 to 2 minutes. The mold was removed from the water, unclamped, and the resulting molded golf ball liquid center was removed. The center weighed about 0.5 ounce and had a solid wall thickness of about 0.15 inch and an outer diameter of 1.075 inches.

A golf ball center made according to the above specific example was then used in the manufacture of a golf ball. Accordingly, the center was placed in Dry Ice until it was frozen solid and it was then wound to a 1.620 inch size with natural rubber thread. The thread was rectangular in shape measuring 0.0625 inch by 0.018 inch and an elongation of 700% was used during winding. The wound core was covered with a balata compound as a cover material and the cover was then vulcanized, cleaned, and painted with a white urethane coating in a conventional manner.

Six balls made according to the foregoing specific example were tested and found to have the following average properties:

| | |
|---|---|
| Diameter _____ inches__ | 1.675 |
| Weight _____ ounces__ | 1.570 |
| Compression [1] _____ | 85 |
| Percent rebound from a 72″ drop_____percent__ | 70 |
| Initial velocity [2] _____ f.p.s__ | 250 |

[1] Tested on an Atti Engineering Corporation golf ball compression tested by conventional test procedure.
[2] The ball velocity during the first ten feet of flight as tested on a U.S.G.A. design velocity test machine.

All six balls were found to perform very well in play and had the same good sound, feel, and playability as other large liquid center balls. All the test data conformed to the United States Golf Association requirements for a tournament approved ball.

The manufacturing process uses a liquid form of a material which contacts the inner surface of a mold and is converted to a solid form while the liquid material located in the central portion remains in a stable liquid state. This results in the formation of a body having a tough skin and a liquid center which then can be put to use, for example as a golf ball center. The liquid center is a stable liquid in that it remains a liquid over a reasonable period of use of the article, e.g. at least about one or two years in the case of a golf ball.

As further specific examples of the manufacture of articles according to this invention, any combination of finely divided vinyl dispersed as a plastisol in a liquid plasticizer, which converts to a solid under application of heat and/or other changes from ambient or normal conditions, may be used. Plasticizers for forming plastisols are well known and widely used in many arts. We have found that the solid wall thickness of the article can be controlled by controlling the conversion or reaction conditions, e.g. the bath temperature and/or emersion time when using thermosetting compositions. For example, in additional runs according to the foregoing specific example, it has been found that 75 seconds in a molten lead bath at 280° C. or 10 seconds in a molten lead bath at 400° C. produce centers similar to those made under the above conditions of 15 seconds at 380 to 385° C. The lower temperature results in a somewhat weaker skin while the higher temperature causes some tearing of the vinyl skin, although both were acceptable. The time and temperature relation will be varied, of course, as the plastisol composition is changed. Optimum conditions can readily be established by simple experimentation.

As another specific example, the mold of FIGS. 2 and 3 was again used and a non-flowing paste was prepared by mixing MEK peroxide with sufficient talc. The resulting paste was used to coat the inside of the spherical mold halves with a layer approximately 3/32" thick. A polyester resin mix was prepared consisting of 97 parts by weight Cyanamid Laminac Resin 4152 (believed to be about 70 parts by weight of a rigid non-promoted low viscosity polyester resin dissolved in about 30 parts by weight styrene) and 3 parts by weight cobalt napthenate solution. This resin mix was then poured into the mold halves over the applied paste to fill the mold halves and the mold was closed and clamped as above. After 16 hours at room temperature the mold was opened and a solid skin liquid filled sphere was removed.

As still another specific example, a paste was made by mixing Cab-O-Sil (a silica powder) with a urethane curative available from E. I. du Pont de Nemours and Company, Inc. under the trade name Caytur. Caytur consists of approximately 85% by weight cumene diamine and 42% by weight m-phenylene diamine. The paste was used to coat the inside of the spherical mold to a layer approximately 3/32" thick. The coated mold was then filled with Adiprene L-100 (an isocynate terminated liquid urethane rubber having a specific gravity of 1.06±0.03 at 25/4° C. and also available from Du Pont). The mold was closed as before and clamped and heated at 285° F. for 120 minutes. The mold was then cooled to room temperature and opened. A solid skin liquid filled sphere was obtained from the mold.

As yet another example, a dispersion of rubber in water is prepared and poured into the mold halves after having coated the mold halves with a coagulant. The dispersion of rubber is a natural rubber latex, such as creamed latex, Hevea, having a 60 to 68% solids content in water and available from H. Muehlstein & Co., Inc. The coagulant is coagulant #3 supplied by General Latex & Chemical Corp. and consists of a 30% solids solution of calcium nitrate in an alcoholic vehicle. For coating the mold, a paste is prepared from the coagulant using talc. The coagulant paste is applied to the mold interior surface and lip and is permitted to dry thoroughly. The latex is then poured into the mold and the mold halves are clamped together. The clamped mold is immersed in hot water at 180° F. for a 5–10 minute period. The mold is then cooled to room temperature and the resulting solid skin liquid center sphere is removed.

In yet a further example, a paste is prepared by mixing triethylene tetramine with a suitable filler and the resulting paste is applied to the interior of the mold. A liquid epoxy resin is added to the mold and the mold is closed, clamped and dipped in a molten lead bath maintained at an elevated temperature of about 400° F. for a few minutes sufficient to set the epoxy resin amine mixture at the inner surface of the mold. The mold is then cooled by immersing in cold water and is opened to recover a spherical article having a hard solid skin and a liquid center.

As indicated above, any convertible liquid can be used in accordance herewith and any conversion technique for converting that liquid can be used under the proper conversion conditions to produce articles of this invention. Although we have given both specific and general examples of the present invention, it is to be understood that much latitude can be left to the practitioner of the invention in the selection of the materials to be used and the conversion system to be used. The materials and systems are well known in the text books and patent art and information can be obtained relating to suitable materials and systems from suppliers of materials. The selection of the material and system is not critical. However, certain physical properties are desirable in the preferred form of the invention where liquid centers for golf balls are produced. For such use, it is preferred that the liquid have a freezing point above about −50° F. so that it can be readily frozen for winding a tight rubber strand and covering the golf ball. For such application, it is also preferred that the skin portion be of a solid flexible elastic plastic material having sufficient resilience to maintain its own form.

Other systems which can be used in converting involve the emulsion, bulky and/or solution polymerization of liquid monomers or liquid prepolymers, such as those of ethylene, vinyl chloride, acrylonitrile, vinyl acetate, styrene, butadiene, isobutylene, methylmethacrylate, vinylidene chloride, chloroprene, tetrafloroethylene, triflorochlorethylene and other ethylenically unsaturated polymerizable compounds. In other systems, for example, the liquid can be ethylene glycol and the coreactant, e.g. coated on the mold, can be terephthalic acid or a carboxyl terminated polymer thereof, thereby producing a skin of polyethylene terephthalate or similar structure, with an ethylene glycol center. Similarly, glycerol can be used as a liquid and phthalic anhydride as the coreactant to form a glyptal type resin, or ethylene glycol or other glycols such as polyethylene glycol can be used as the liquid and maleic anhydride can be used as the coreactant, e.g. coated on the mold interior as a melt, to form an alkyd resin skin. In this latter system, the skin can further be converted by thermosetting, e.g. by contacting with a peroxidic or other catalytic material. Similarly, ethylene dichloride can be used as a liquid and sodium polysulphide as the coreactant or conversion agent to form a thiokol skin, or a diisocyanate can be used as the liquid and a viscous paste containing polyester can be used as the coreactant.

In still another system, a light permeable mold, e.g. of glass or other translucent material, can be filled with a light or heat convertible liquid substance, and can be irradiated with radiant heat or light to convert the outer portion of the substance. For example, a glass mold interior can be coated with a heat sensitive catalyst such as benzoyl peroxide and a liquid substance comprising polyester, alkyd and/or acrylic or other vinyl resin, e.g. the vinyl plastisol used in the specific example discussed with reference to FIGURES 2 and 3, can be placed in the mold; the mold can then be closed, irradiated with infrared radiation to set the outer portion of the resin and thereby create the solid skin or shell. Alternatively, the glass mold interior can be coated with a light-sensitive catalyst, e.g. an azo catalyst such as alpha,alpha' azodiisobutyronitrile, the mold can be filled with the plastisol, closed, and irradiated with ultraviolet light until the solid skin forms. Similar systems can be used for solidifying a skin using numerous other radiant energy sources, such as electron generators, gamma and/or beta rays, X-rays, etc., by proper selection of the convertible liquid and catalyst where needed. Suitable resin and/or catalyst components for all such systems are well known to those in the art.

It will be apparent from the foregoing that we have provided a new and useful article. The article can be manufactured in a one-step molding procedure in which only the outer portion of a liquid mass is caused to react with a coreactant to form a solid shell or skin around the liquid mass. It is an advantage of such a system that it eliminates a number of steps previously considered necessary in the production of liquid center articles of manufacture.

We claim:

1. A golf ball comprising a core, and a cover over the core, said core consisting essentially of a generally uniform solid continuous outer skin which remains solid at ambient temperatures enclosing a shelf stable liquid central portion which remains a stable liquid at ambient temperatures, said skin having a set solid molecular structure containing the molecular structure of molecules of the liquid of said central portion and being characterized in that it has the structural characteristics of the set solid structure which is formed when a liquid as in said central portion sets to a solid state.

2. The article of claim 1 wherein said skin is of readily flexible elastic plastic material having sufficient resilience to maintain its form.

3. The article of claim 1 wherein said skin is of a set solid plastic and said liquid is a monomeric precursor of the set solid plastic.

4. The golf ball of claim 1 wherein the major portion of the core consists of said liquid central portion.

5. The golf ball of claim 1 including a rubber strand wound over said core and in which said cover directly overlies and is secured to said wound strand.

6. The golf ball of claim 1 wherein the liquid portion has a freezing point about —50° F.

7. The golf ball of claim 1 wherein the liquid portion fills the enclosure within said skin.

References Cited

UNITED STATES PATENTS

| | | | |
|---|---|---|---|
| 2,229,170 | 1/1941 | Greene | 273—231 |
| 3,095,261 | 6/1963 | Meyer. | |

FOREIGN PATENTS 1,049,573    11/1966    Great Britain.

GEORGE J. MARLO, Primary Examiner

U.S. Cl. X.R.

161—168; 264—319; 282—28